United States Patent [19]

Trytko

[11] Patent Number: 4,591,925
[45] Date of Patent: May 27, 1986

[54] ENCODED DROPOUT COMPENSATOR SYSTEM

[75] Inventor: David E. Trytko, Foster City, Calif.

[73] Assignee: Ampex Corporation, Redwood City, Calif.

[21] Appl. No.: 483,060

[22] Filed: Apr. 6, 1983

[51] Int. Cl.⁴ ..................... H04N 9/491; H04N 5/782
[52] U.S. Cl. .................................. 358/336; 360/38.1
[58] Field of Search ............. 358/336, 314; 360/38.1, 360/36.2; 369/59; 371/37, 38, 39

[56] References Cited

U.S. PATENT DOCUMENTS

| | | | |
|---|---|---|---|
| 4,199,780 | 4/1980 | Taylor | 360/38.1 X |
| 4,287,529 | 9/1981 | Tatami et al. | 360/38.1 X |
| 4,398,224 | 8/1983 | Watanabe | 360/38.1 X |
| 4,477,842 | 10/1984 | Kaneko | 358/336 |

Primary Examiner—Robert L. Richardson
Attorney, Agent, or Firm—George B. Almeida; Joel D. Talcott

[57] ABSTRACT

A range of digital values is assigned to represent a digitized composite signal, while a selected digital value of the range is assigned as a unique dropout sample to represent only a dropout in the signal to the exclusion of signal data. In the event of a dropout, the unique dropout sample is loaded into memory in place of the corresponding incorrect signal data. The unique dropout sample is detected upon read out of data from memory and used to initiate the process of dropout compensation.

24 Claims, 4 Drawing Figures

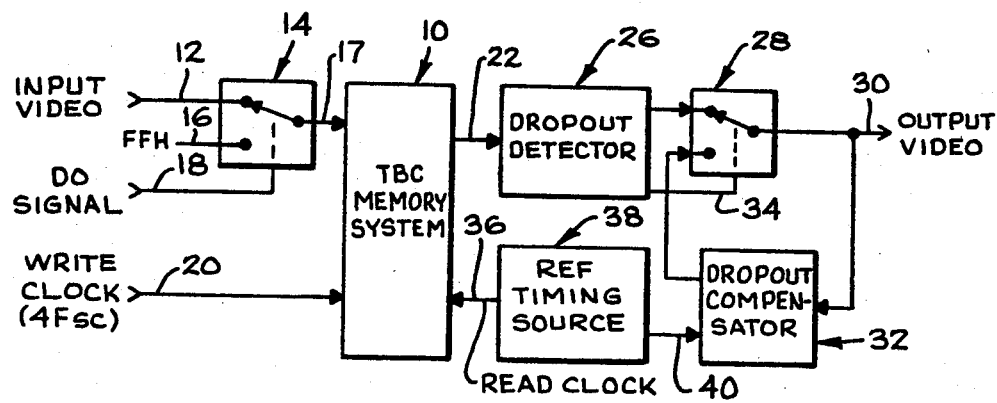
FIG_1
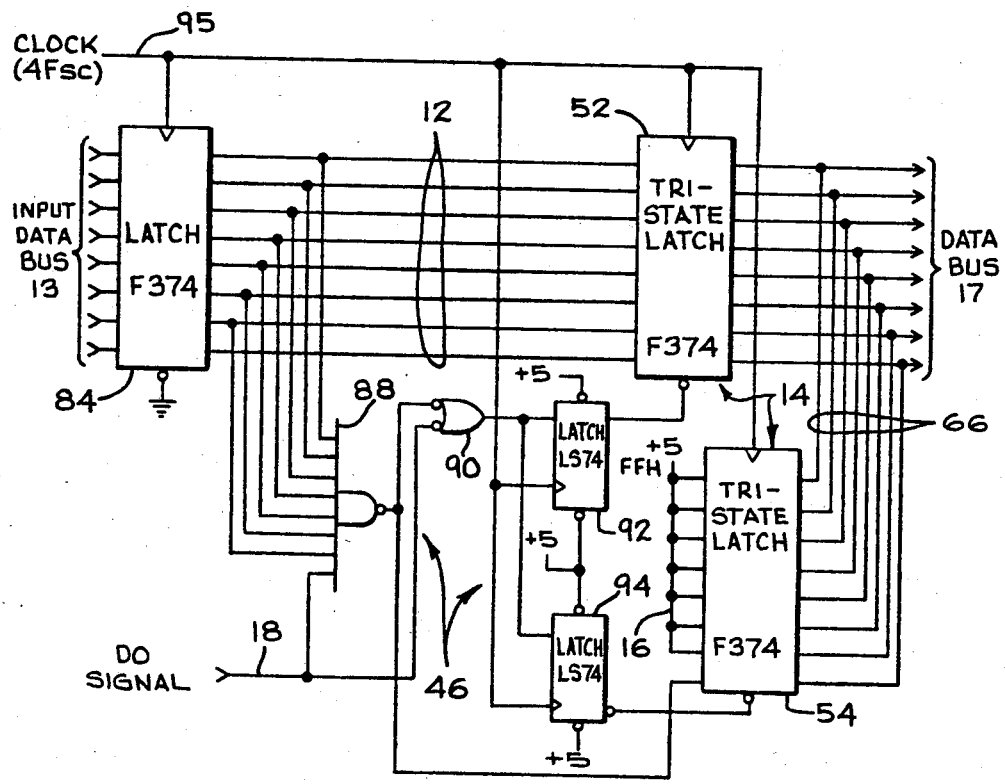
FIG_3

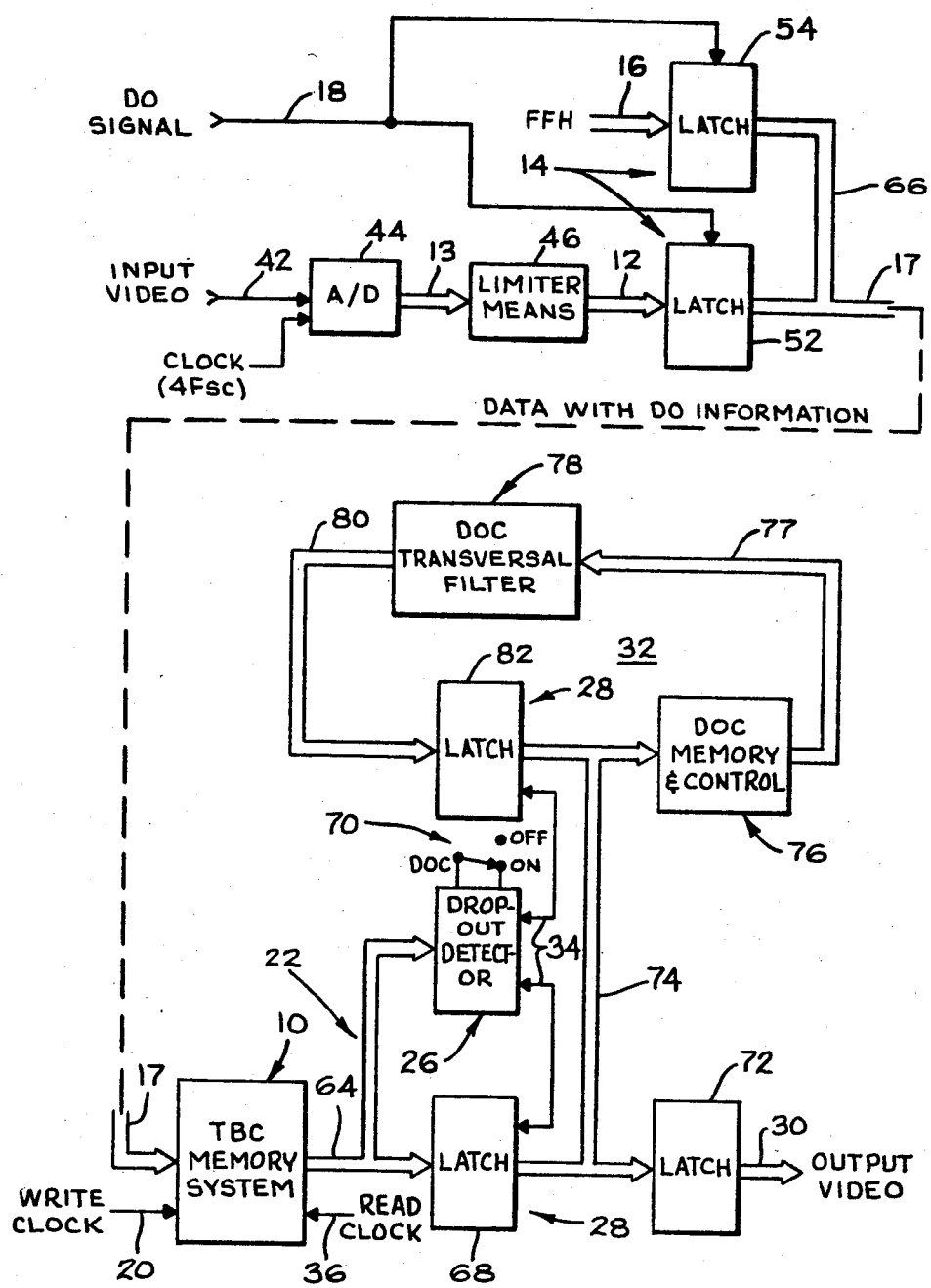
FIG_2

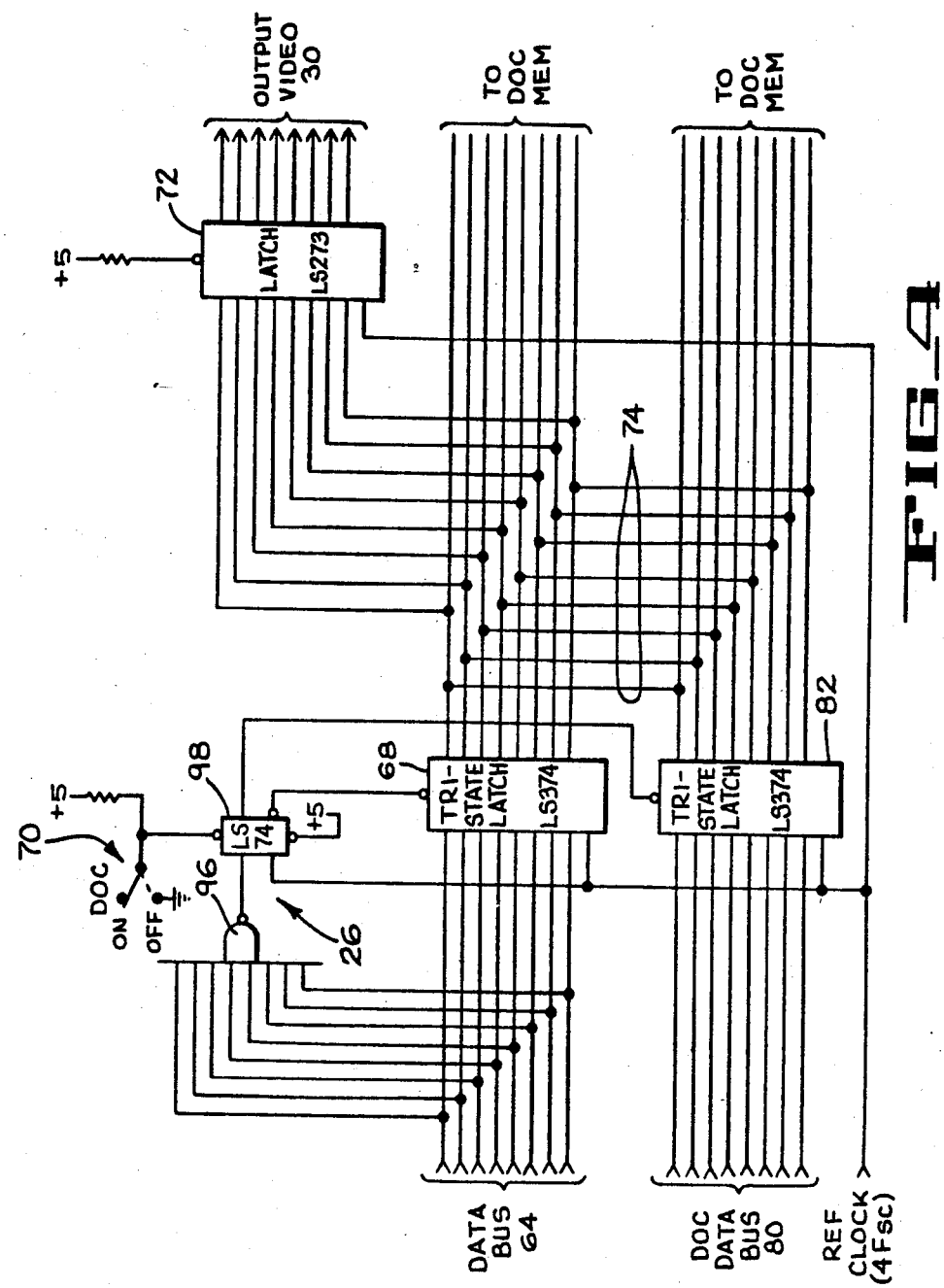

ENCODED DROPOUT COMPENSATOR SYSTEM

CROSS REFERENCE TO RELATED APPLICATION

Chrominance Inverting All Pass Filter, U.S. Pat. No. 4,528,598, issued July 9, 1985 to David E. Trytko and Steven D. Wagner.

BACKGROUND AND SUMMARY OF THE INVENTION

The invention relates to dropout compensation and particularly to dropout compensation performed at the read side of a time base corrector memory, wherein dropout timing is preserved by selectively encoding the incoming video data.

In the field of color television, the process commonly known as dropout compensation is performed during the reproduction of video signals. The corresponding dropout compensators provide compensation by replacing an incorrect or missing portion of the color television signal, commonly called a "dropout", which is caused by an improper recording or reproduction process, or by a defect in the recording medium. Thus, disturbing effects which would be caused in a television picture by the presence of such a dropout, and which are readily seen by a viewer, are removed by the dropout compensation process. Typical of such process and apparatus for performing digital dropout compensation is the system described, for example, in U.S. Pat. No. 4,251,831 to B. Y. Kamath, assigned to the same assignee as this application, wherein a suitable band-pass filter, and a dropout compensator employing the filter, provide digital circuits for separating the components of a composite signal for further processing, and for subsequently recombining the components to reconstitute an altered composite signal during reproduction from magnetic tape.

An example of another prior art digital dropout compensator is described in the manual "AVR-2 Video Tape Recorder, Theory of Operation", Catalog No. 1809179-01, published by Ampex Corporation, November 1977, pages 9-10, 9-14, 9-20, and 9-77 to 9-92.

In order to perform the dropout compensation process, the location of the dropout must be detected and preserved; that is, dropout timing must be preserved to allow subsequently replacing the specific incorrect video data with dropout corrected video data. Since dropout timing inherently is related to tape input video, dropout compensators traditionally have been placed on the input, i.e., write side, of the time base corrector memory employed in a conventional video processing system. Since the input clock of a video signal being read from tape is highly unstable and capable of varying rates of, for example, from 0.5 to 1.7 times normal, as when operating in the high speed shuttle mode, complex counters and very high speed memory are required in a dropout compensator located at the write side of memory in order to perform the dropout compensation process.

More particularly, when the dropout compensator is at the write side of memory it is more dependent upon tape speed. That is, the voltage controlled oscillator located at the input to memory, produces a clock that is continously changing with tape speed as it trys to track the video information off tape. It follows that the dropout compensator circuit must also operate with the unstable clock, particularly when in the shuttle mode of operation. The dropout compensator circuit must be capable of operating over a wide range of frequencies corresponding to the range of tape speeds and the resulting unstable high rate input clock. Thus the requirement for complex counters and the very high speed memory of previous mention.

For the above reasons, it would be preferable to locate the dropout compensator system on the output or read side of memory, since the read clock for the memory always operates at a fixed frequency; for example, at 14.3 megaHertz, (MHz) for a color television recorder system employing a 4Fsc data sample rate. Since a stable clock of fixed frequency is available at the read side of the memory, a dropout compensator of simplified design, with reduced memory speed requirements, may be utilized. However, since the read and write operations, and thus the timing thereof, are operating independently of each other, preserving the location of the dropout on the write side of memory and transferring the timing information to the read side of memory, becomes a problem. The problem is compounded by the fact that time base correction systems typically read out the stored digital video several lines later relative to the location in which the data was loaded into memory. Thus the initial dropout location, that is, the delayed timing information indicative thereof, must be transferred with precision to the output side of memory.

Time base corrector systems are available wherein the dropout compensator is disposed at the read side of memory. Typically in such systems, the dropout timing information is transferred from the write to the read side of memory by employing a separate dropout memory and memory control to preserve and transfer the dropout timing information. To this end, while video data is being written into the TBC memory, the presence or absence of dropouts simultaneously is loaded into the dropout memory. During the readout of video data from the TBC memory, the dropout timing information is simultaneously extracted from the dropout memory, whereby the time of occurrence of dropouts in the video data is detected, and dropout compensation is effected. It may be seen that in such systems the location of the dropout compensator at the read side of memory requires an extra memory and associated control circuit in order to preserve the timing information.

Accordingly, it is an object of the invention to locate a dropout compensator system at the read side of a time base corrector memory.

Another object is to circumvent the use of a separate dropout memory and control therefor, while precisely transferring the dropout timing information to the read side of memory.

Still another object is to operate a dropout compensator with the stable read clock of fixed frequency on the output side of memory.

A further object is to provide transfer of the dropout information to the read side of memory by modifing select video data samples to preserve the time of occurrence of dropouts.

A yet further object is to transfer the dropout timing information, in an 8-bit system, by assigning an incorrect video data sample the maximum or minimum digital value of 255 or zero, respectively, and inserting the sample in the video data path.

Still another object is to represent the occurrence of a dropout as a digital word, within the video data path, of all "1"s or all "0"s, whereupon the word is subsequently detected by sensing the all "1"s or all "0"s.

The foregoing and other objects are accomplished by the invention while overcoming the various disadvantages of the above-mentioned prior art, by locating the dropout compensator system at the read side of the TBC memory, while selectively encoding the video data as it is being written into memory to indicate the exact location of a dropout, or dropouts. To this end, when a dropout occurs as conventionally indicated, for example, by an RF envelope detector in the video tape recorder system, the video samples are modified to provide a digital value which is indicative of the occurrence of the dropout. For example, in an 8-bit digital system, the invention comtemplates the use of an 8-bit data sample with the maximum digital value of 255 corresponding to all "1" bits (FFH in the hex notation) to indicate that a dropout has occurred. Thus, valid video data is precluded from using the value of 255, but is limited to a maximum digital value of 254, i.e., FEH in the hex notation. The value 255 (FFH) indicative of the dropout is inserted in the video data path along with the valid video data. During read out of the video data from the TBC memory, the value 255 readily is detected on the read side of memory and is used to activate the associated dropout compensator circuit to replace the incorrect video data with dropout compensated video data.

BRIEF DESCRIPTION OF THE DRAWINGS

FIG. 1 is a block diagram of the dropout compensator system of the invention.

FIG. 2 is a block diagram of the system of FIG. 1 in greater detail.

FIG. 3 is a schematic diagram of the dropout encoding scheme of FIGS. 1 and 2 in greater detail.

FIG. 4 is a schematic diagram of the dropout detector and switching latches of FIGS. 1 and 2.

DESCRIPTION OF THE PREFERRED EMBODIMENTS

As previously discussed, locating the dropout compensator on the read side of the time base corrector (TBC) memory, allows the dropout compensator (DOC) of the invention to always read out video data from memory using a stable reference clock. For example, in an NTSC system having a sampling rate of 4Fsc, the read clock is 14.3 MHz. However, in such a system the dropout timing information must be transferred to the read side of memory, since reading out of the video data is conducted several lines after the memory has been loaded. The invention provides a relatively simple technique and circuit for effectively realizing the above features. By way of example only, the system is described hereinbelow in a typical digital video processing system employing 8-bit data samples, whereby accordingly, the digital sample values normally used to represent the video data range from zero to 255. In addition, the description herein employs a sample rate of 4Fsc, whereby the various clocks also use 4Fsc, but by way of example only.

In accordance with the invention, the digital sample values representing the video data are limited to the range of zero to 254, i.e., are limited to FEH in the conventional hex notation. It follows that even if the analog-to-digital (A/D) converter were overloaded with video levels higher than it can sample, the maximum sample value employed to represent the video signal is FEH, i.e., the digital value 254. The digital value FFH, corresponding to the maximum digital sample value 255, thus is available and is assigned as a unique dropout sample to represent the occurrence of a dropout at the particular sample time interval. Since FFH is assigned to represent a dropout, its presence in a video data stream indicates that the corresponding sample, or samples, etc, are invalid video. The occurrence of a dropout is detected in conventional fashion; for example, by means of an RF envelope level detector which monitors the amplitude level of the modulated television signal carrier waveform. Upon detecting the dropout, and in accordance with the invention, the incorrect video data is replaced with the digital value 255, corresponding to all "1"s in the 8-bit word system employed by way of example only in the description herein.

In an alternative embodiment, the system of the invention may employ the digital value of zero, i.e., a digital sample of all "0"s, to represent the dropout. Thus it may be seen that the dropout may be represented by a unique digital value which lies at either end of the range of digital values normally used to represent the video data samples. Since the unique digital dropout sample is inserted in the video data path, its presence at the read side of memory relative to the video data, is precisely at the location at which the dropout occurred on the write side of memory. It is therefore a readily simple matter to detect the maximum or minimum digital value at the read side of memory, whereby dropout compensation may be performed to replace the incorrect video with dropout compensated video in generally conventional fashion.

Obviously, if the video is limited to digital values from zero to 254, or from 1 to 255, the invention further contemplates assigning to the unique dropout sample a digital value which lies within the range of digital values, and which is detected during read out. When valid video equals the value of that assigned to the dropout, the encoding scheme replaces the valid video sample with 255 or with zero. Further, the valid video can be limited to a more resticted range if desired; for example to a range of zero to 253, or 2 to 254, etc. Thus the invention comtemplates assigning any digital value to the unique dropout sample within the range employed to represent valid video.

Thus the invention combination provides the further advantage of not having to keep track of the dropout timing information, but to simply monitor the video data as it is read from memory to detect the unique dropout samples.

Accordingly, referring to FIG. 1, a generally conventional time base corrector (TBC) memory system 10 is disposed to receive digitized video data in response to a write clock, and to provide read out of temporarily stored digital video data in response to a read clock. Such memory system as well as address and clocking control therefor, may be found in the aforementioned U.S. Pat. No. 4,251,831. Digital input video data from off-tape is provided on an 8-bit input data bus 12, which is coupled to a first data path through an input switch means 14. An FFH input 16 is coupled to a second data path through the switch means 14, and provides, in effect, the unique dropout sample FFH upon the occurrence of a dropout, as further described in FIG. 3. The input switch means 14 is controlled via a dropout (DO) signal on a control line 18, which is supplied by the video tape recorder system, and particularly by an RF envelope level detector which monitors the amplitude level of the modulated television signal carrier waveform and herein supplies a logic low in the event of a dropout. When a low is present on line 18, switch means 14 inserts the digital value FFH from line 16 into the video data stream in a data bus 17, in place of the incorrect sample or samples of incoming video data on bus 12. The valid video data samples along with the dropout samples, are clocked into the TBC memory system 10 via a write clock on a line 20, which comprises the 4Fsc timing clock conventionally derived off-tape. As previously described, the write clock is generally unstable and capable of rates varying from below normal to 1.7 times normal as when the tape is being pulled at shuttle speeds.

The video and dropout sample data are supplied via a bus 22 from TBC memory system 10 to a dropout detector means 26, i.e., a value FFH, etc., detector, which detects the unique dropout sample corresponding to the presence of a dropout. An output switch means 28 is depicted as coupled at a first data path thereof to the dropout detector means 26. A video data output corresponding to valid video data, or dropout compensated (DOC) video data, is provided on an output data bus 30. Dropout compensator means 32, which may be of generally conventional configuration, is coupled to the output data bus 30, and thence back to a second data path through the output switch means 28. Thus, in the event that the dropout detector 26 senses a dropout in the form of the unique dropout sample FFH, a control signal is supplied from the detector 26 to the output switch means 28 via a control line 34. This places the dropout compensator means 32 in the circuit, thereby replacing the incorrect video data, i.e., the unique dropout sample, with DOC video data from the dropout compensator means 32. The TBC memory system 10 is read out in response to a read clock on a line 36, which clock is supplied by a reference timing source 38. The latter provides the stable read clock at a fixed frequency such as, in this example, the reference 4Fsc frequency of 14.3 MHz corresponding to the data sample rate of the tape recorder system. The reference timing source 38 also provides a timing control (which may be the same 4Fsc read clock) via a line 40 to the dropout compensator means 32, to synchronize the operation thereof with the unloading of the TBC memory system 10.

Referring now to FIG. 2, there is shown in greater detail the combination of FIG. 1, wherein like components are similarly numbered. Accordingly, composite video from off-tape in the analog domain is supplied on an input line 42, extending to an A/D converter 44. The composite video signal is digitized via the A/D converter 44 at the 4Fsc sample rate used by way of description, and is supplied on input data bus 13 to digital value limiter means 46 as successive 8-bit digital video data samples. The limiter means 46 is coupled to a first tri-state input latch 52 corresponding to part of the input switch means 14 of FIG. 1. A second tri-state input latch 54 has coupled thereto the FFH input 16 which, in effect, provides the unique dropout value 255 corresponding to the presence of a dropout. The tri-state input latches 52, 54 are controlled via the dropout signal of previous mention on the control line 18. Thus, the presence of a low logic state on the line 18 indicates the occurrence of a dropout, whereby tri-state input latch 52 is turned off and tri-state input latch 54 is turned on. The incorrect video sample or samples on input data bus 12 thus are replaced with a sample or samples of the digitial value 255, via a bus 66 coupled from latch 54 to the video data bus 17.

The video data bus 17 is coupled to the write side of the TBC memory system 10. The write clock on line 20, and the read clock on line 36 provide loading and readout, respectively, of video data samples along with the unique dropout samples FFH which were inserted upon the occurrence of dropouts. The data are read from the memory system 10 at the fixed read rate of reference 4Fsc and are fed via a data bus 64 to a first tri-state output latch 68, as well as to the dropout detector means 26 of previous mention. The latter has a dropout compensator (DOC) on/off switch 70 which provides for disabling the dropout detector means 26. In the absence of dropouts, valid video data are supplied from the output of the tristate output latch 68 to an output bus data latch 72, and thence to the output data bus 30. The valid video data also are fed to the input of the dropout compensator means 32 of FIG. 1, via a tri-state data bus 74.

More particularly, the data bus 74 is coupled to a DOC memory/ control means 76 and thence to a DOC digital transversal filter means 78 via a DOC memory data bus 77. The output of the transversal filter means 78 is supplied via a filter output bus 80 to a second tri-state output latch 82. The tri-state output latches 68 and 82 comprise the output switch means 28 of FIG. 1. The tri-state output latch 82 provides dropout corrected video data back to the DOC memory/control means 76 in the event the dropout detector means 26 continues to detect the unique dropout sample. The dropout corrected video data is also supplied to the output bus data latch 72 via the tri-state data bus 74. The conditions of the tri-state output latches 68, 82 are controlled via the logic state on the control lines 34 extending from the dropout detector means 26.

The dropout compensator means 32 of FIGS. 1 and 2 are typified by dropout compensators conventionally known in the art and shown, for example, in the U.S. Pat. No. 4,251,831 and the AVR-2 catalog of previous mention In response to the detection of a dropout by the dropout detector means 26, the dropout compensator means 32 may replace one or more samples in a line of video data, or may replace an entire line, or lines of video data, if such lines have incorrect video throughout. Thus, for example the DOC memory/control means 76 may include a one-line delay, wherein the video data is fed to the DOC digital transversal filter means 78 for processing of the chrominance component in conventional fashion to preserve the phase relationship between chrominance and luminance when processing different lines of video data. The chrominance and luminance components are then re-combined and supplied via bus 80 and latch 82 to the latch 72. Since the dropout compensator means 32 and the associated process of luminance and chrominance component processing per se are generally conventional and described in the above-mentioned references, which are incorporated herein by reference, no further description is included herein.

FIG. 3 includes in greater detail the means for selectively encoding the video data samples, to define the unique dropout sample indicative of the occurrence of a dropout. The means include one implementation of the limiter means 46 by way of example only. To this end, input data bus 13 is coupled to an input bus latch 84 and thence to the tri-state input latch 52 of the input data bus 12. The output of latch 52 couples to the data bus 17 of the previous figures. The limiter means 46 for encoding the unique dropout sample and for limiting the valid video samples to FEH, generally extend from the input data bus 12 to provide control signals to the tri-state input latches 52, 54. More particularly, a NAND gate 88 includes seven inputs corresponding to the seven most significant bit (MSB) lines of the data bus 12, and further includes an eighth or least significant bit (LSB) input coupled to the control line 18 extending from the tape recorder system. The output of the NAND gate 88 is coupled to one input of an OR gate 90, whose output is coupled to the inputs of a pair of latches 92, 94. The second input of OR gate 90 is coupled to the dropout control line 18. The output of NAND gate 88 also is coupled to the LSB input of the tri-state input latch 54. The true output of the latch 92 is coupled to the control input of the tri-state input latch 52, while the not-true output of the latch 94 is coupled to the control input of the tri-state input latch 54. The seven MSB inputs of the input latch 54 are coupled to a +5 volt source, which supplies thus seven digital "1"s corresponding to the seven MSB of the unique dropout sample FFH. The output of the tri-state input latch 54 is coupled via the bus 66 to the data bus 17. The input bus latch 84, latches 92, 94 and the tri-state input latches 52, 54 all are clocked by the off-tape 4Fsc timing clock on a clock line 95.

Thus, in operation, assuming there is no dropout and that valid video data is being processed on the input data bus 12, the dropout signal on the control line 18 is a logical high, which places a digital "1" on the LSB input of the NAND gate 88, as well as on the second input to the OR gate 90. However, if the video level is very high, i.e., is equal to or greater than FEH, the NAND gate 88 detects eight "1"s at its input, which is indicative at NAND gate 88, that the video data should be limited since no dropout exists. Under such operating conditions, the limiter means 46 must limit the valid video samples to a digital value of 254 (FEH). To this end, the NAND gate 88 supplies a low to one input of the OR gate 90, therefore providing a high logic level at its output. Thus high logic levels are applied to the inputs of the latches 92, 94 which in turn, turn off the tri-state input latch 52 and turn on the tri-state input latch 54, respectively. The tri-state input latch 54, however, is coupled at its LSB input to the output of the NAND gate 88 and thus has a low or "0" logic state thereon. Accordingly, the output of the tri-state input latch 54 comprises seven "1"s and a "0" at its LSB, thereby supplying the digital sample value of 254 corresponding to FEH to the data bus 17. This is indicative of valid video data, and thus a dropout is not indicated.

In the event a dropout does occur, the dropout signal on control line 18 goes low, which places a zero on the LSB input of the NAND gate 88. The latter places a high on the first input of the OR gate 90, which however, also receives a low from the control line 18 on its second input. The OR gate 90 thus supplies a high to the latches 92, 94 which supply a high to the tri-state input latch 52 to turn it off, and a low to the tri-state input latch 54 to turn it on. Since a dropout is detected, the tri-state input latch 54 now receives a "1" at its LSB input as supplied by the high on the output of NAND gate 88. It follows that the tri-state input latch 54 now supplies an output of eight "1"s, i.e., FFH, to the data bus 17, which is indicative of a dropout and the fact that incorrect video data is on the data bus 12. The incorrect data sample is replaced by the unique dropout sample FFH which is inserted into the data stream on the data bus 17 and is supplied to the TBC memory system 10 for storage along with the valid video data samples, as previously described in FIG. 2.

Referring now to FIG. 4, there is included a schematic of the dropout detector means 26 and the tri-state output latches 68, 82 of FIG. 2. The circuit provides means for detecting the unique dropout sample inserted in the valid video data supplied via the data bus 17 and read out from the TBC memory system 10 via the data bus 64. More particularly, the data bus 64 supplies the 8-bit samples from the memory to a detector NAND gate 96 which, in turn, is coupled to a latch 98 which provides suitable delay to allow switching of the tri-state output latches 68, 82 on the next incoming clock pulse after detection of the dropout. The true output of latch 98 is coupled to the control input of tri-state output latch 82, while the not-true output thereof is coupled to the tri-state output latch 68. The DOC on/off switch 70 is coupled to the latch 98 to disable the latter.

As long as valid video, i.e., digital data samples limited to FEH, are present on data bus 64, a zero is supplied to the LSB input of the NAND gate 96. The latter supplies a high to the latch 98 which allows the tri-state output latch 68 to pass valid video data to the output bus data latch 72 and the output data bus 30. In the event a unique dropout sample, i.e., FFH, is detected by the detector NAND gate 96 as a sample of all "1"s, the latch 98 turns off the tri-state output latch 68 and turns on the tri-state output latch 82. Thus, dropout corrected video data from the dropout compensator means 32 is supplied via the tri-state output latch 82 and the data bus 74 to replace the corresponding dropout sample.

The digital filter 78 is described inter alia in U.S. Pat. No. 4,528,598, issued to David E. Trytko, et al, entitled, "Chrominance Inverting All Pass Filter", which description is thereby incorporated herein by reference. Obviously, other digital filters and dropout compensator circuits, such as that in the U.S. Pat. No. 4,251,831 of previous mention, also may be employed to define the dropout compensator 32 depicted herein by way of example only. Since digital filters and dropout compensators are known in the art, no further description thereof is included herein.

Although tri-state latches are shown herein for latches 52, 54, 68 and 82, same may be replaced by multiplexing circuits configured to receive respective input buses and to switch therebetween to provide the functions of the latches in response to control signals from the respective controlling devices, viz, limiter means 46 and dropout detector means 26.

Further, the system of the invention may be used in other than 8-bit digital systems. For example, in a 4-bit digital system the unique dropout sample would be assigned the value FH in hex notation; a 12-bit system would use the value FFFH, etc.

What is claimed is:

1. A system for compensating dropouts in a given signal converted to a stream of digital data samples, comprising:
    means for supplying a unique dropout sample indicative of the occurrence of an incorrect digital data sample corresponding to a dropout;
    memory means for storing the unique dropout sample within the stream of digital data samples;
    means for detecting the unique dropout sample during read out from the memory means of the combined stream of stored digital data and dropout samples; and means responsive to the detecting means for replacing the unique dropout sample with a selected valid digital data sample.

2. The system of claim 1 wherein the means for supplying include:

means for indicating the presence or absence of incorrect digital data samples; and means responsive to the indication of an incorrect digital data sample by the indicating means, for generating the unique dropout sample as a digital value which is excluded from the range of digital values assigned to the valid digital data samples.

3. The system of claim 2 further including:

first switching means integral with the supplying means for replacing a digital data sample with the unique dropout sample upon the occurrence of the a dropout.

4. The system of claim 3 wherein the first switching means include:

first input latch means for supplying the digital data samples to the write side of the memory means in the absence of incorrect digital data samples; and second input latch means for supplying the unique dropout sample from the unique sample generating means to the write side of the memory means in the presense of a dropout.

5. The system of claim 1 wherein the detecting means further include:

dropout detector means coupled to the read side of the memory means for detecting the unique dropout sample.

6. The system of claim 5 wherein the means for replacing include:

dropout compensator means operatively coupled to the read side of the memory means for supplying the selected valid digital data samples; and second switching means responsive to the dropout detector means for replacing a unique dropout sample with a selected valid digital data sample.

7. A system for compensating for dropouts in a video signal converted to digital video data samples, the system including means for generating a dropout signal indicative of the occurrence of a dropout, comprising:

memory means having an input data bus for loading the video data samples in response to a write clock, and an output data bus for reading out the video data samples in response to a read clock;

means for generating a unique dropout sample indicative of the occurrence of the dropout;

input switching means coupled to the input data bus for replacing a video data sample with the unique dropout sample in response to the dropout signal;

means coupled to the output data bus for detecting the presence therein of the unique dropout sample;

dropout compensator means for receiving the video data samples and for selectively generating dropout compensated video data samples therefrom; and output switching means coupled to the output data bus and to the dropout compensator means for replacing the unique dropout sample with a dropout compensated video data sample in response to the detecting means.

8. The system of claim 7 wherein the means for generating the unique dropout sample include:

means for limiting the video data samples to a selected range of digital values while assigning a digital value excluded from the range to the unique dropout sample.

9. The system of claim 8 wherein the assigned digital value of the unique dropout sample corresponds to all "1" bits.

10. The system of claim 9 employing an 8-bit system, wherein the video data samples are limited to digital values ranging from zero to 254 while the assigned digital value for the unique dropout sample is 255.

11. The system of claim 8 wherein the assigned digital value of the unique dropout sample corresponds to all "0" bits.

12. The system of claim 11 employing an 8-bit system, wherein the video data samples are limited to digital values ranging from 1 to 255 while the assigned digital value for the unique dropout sample is zero.

13. The system of claim 7 wherein the output switching means include:

output latch means coupled to the output data bus and to the dropout compensator means and responsive to the detecting means to replace the unique dropout sample with the dropout compensated video data sample.

14. The system of claim 8 wherein the input switching means include:

input latch means coupled to the input data bus and to the means for limiting and responsive to the dropout signal to replace a video data sample corresponding to a dropout with the unique dropout sample.

15. The system of claim 14 wherein the means for limiting include:

multiple input gate means having its least significant bit input coupled to the dropout signal and its remaining inputs coupled to respective lines of the input data bus;

OR gate means coupled to the dropout signal and to the multiple input gate means output;

dual latch means coupled from the OR gate means output to the input latch means; and wherein the input latch means supply the unique dropout sample to the input data bus when the multiple input gate means detects the dropout signal.

16. A system for compensating dropouts in a given signal converted to a stream of digital data samples, comprising:

memory means having a write side for loading, and a read side for reading out, the stream of digital data samples;

means coupled to the write side of the memory means for inserting a unique dropout sample in the stream of digital data samples in place of a dropout;

means coupled to the read side of the memory means for detecting the presence of a unique dropout sample in the stream of digital data samples; and means responsive to the detecting means for replacing the unique dropout sample with a valid digital data sample.

17. The system of claim 16 wherein the means for inserting include:

means for supplying a dropout signal indicative of a dropout:

encoding means for assigning the unique dropout sample a digital value excluded from the digital values representing the digital data samples; and switching means for replacing a dropout in the stream of digital data samples with the excluded digital value in response to the occurrence of the dropout.

18. The system of claim 17 wherein the means for replacing include:
dropout compensator means operatively coupled to the read side of the memory means for supplying a dropout compensated data sample in response to the presence of a unique dropout.

19. The system of claim 18 wherein the detecting means include:
a detector coupled to the read side of the memory means for detecting the unique dropout sample; and
switching means coupled to the dropout compensator means and responsive to the detector for replacing the unique dropout sample with a dropout compensated data sample.

20. A system for compensating dropouts in a video signal, wherein the signal is converted to digital data samples within a given range of digital values, comprising:
memory means including a write bus for loading and a read bus for reading out the digital data samples;
means for supplying a dropout signal indicative of a dropout;
gating means coupled to the write bus and to the means for supplying for monitoring the digital data samples and the dropout signal;
input switching means responsive to the gating means for inserting a unique dropout sample in the write bus in place of a digital data sample corresponding to a dropout;
detector means coupled to the read bus for detecting the presence of the unique dropout sample among the digital data samples;
dropout compensator means operatively coupled to the read bus for receiving the digital data samples and for providing dropout compensated data samples in response to the unique dropout sample; and
output switching means coupled to the read bus and to the dropout compensator means for replacing the unique dropout sample with the dropout compensated data sample in response to the detector means.

21. The system of claim 6 wherein the second switching means include:
first output latch means for passing the digital data samples from the memory means in the absence of a unique dropout sample; and
second output latch means for inserting a dropout compensated digital data sample corresponding to the selected valid digital data sample in place of the unique dropout sample read out of the memory means.

22. The system of claim 6 wherein the unique dropout sample is represented by a digital value which is excluded from the range of digital values assigned to the valid digital data samples.

23. The system of claim 6 wherein the dropout compensator means includes means for supplying the selected valid digital data sample from an adjacent line of samples or from earlier or later samples in the same line.

24. The system of claim 18 wherein the dropout compensator means includes means for supplying the dropout compensated data sample from selected adjacent data samples of the stream of digital data samples.

* * * * *

UNITED STATES PATENT AND TRADEMARK OFFICE
CERTIFICATE OF CORRECTION

PATENT NO. : 4,591,925
DATED : May 27, 1986
INVENTOR(S) : David E. Trytko

It is certified that error appears in the above-identified patent and that said Letters Patent is hereby corrected as shown below:

Column 11, line 10, after "dropout", insert --sample--.

Signed and Sealed this

Fourteenth Day of October, 1986

[SEAL]

*Attest:*

DONALD J. QUIGG

*Attesting Officer*  *Commissioner of Patents and Trademarks*